(12) United States Patent
Nagatsuka et al.

(10) Patent No.: US 7,324,873 B2
(45) Date of Patent: Jan. 29, 2008

(54) OFFLINE TEACHING APPARATUS FOR ROBOT

(75) Inventors: Yoshiharu Nagatsuka, Yamanashi (JP); Kozo Inoue, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/545,577

(22) Filed: Oct. 11, 2006

(65) Prior Publication Data

US 2007/0083291 A1 Apr. 12, 2007

(30) Foreign Application Priority Data

Oct. 12, 2005 (JP) .............................. 2005-297426

(51) Int. Cl.
*G05B 19/18* (2006.01)
*G05B 19/04* (2006.01)

(52) U.S. Cl. ...................... 700/252; 700/245; 700/246; 700/247; 700/248; 700/249; 700/250; 700/251; 700/254; 700/264; 701/23; 901/6; 901/9; 901/46

(58) Field of Classification Search ................ 700/245, 700/247, 257, 258, 259, 260, 262, 264, 246, 700/47, 248, 249, 250, 251, 254; 701/23; 901/6, 9, 46
See application file for complete search history.

(56) References Cited

U.S. PATENT DOCUMENTS

| | | | | |
|---|---|---|---|---|
| 4,433,382 A | * | 2/1984 | Cunningham et al. | ...... 700/192 |
| 4,868,473 A | * | 9/1989 | Kato | ........................... 700/254 |
| 5,412,759 A | * | 5/1995 | Yano et al. | .................. 700/248 |
| 5,724,489 A | * | 3/1998 | Yamamoto et al. | ......... 700/245 |
| 6,321,139 B1 | * | 11/2001 | Terada et al. | ................ 700/245 |

(Continued)

FOREIGN PATENT DOCUMENTS

JP 6-337711 12/1994

(Continued)

OTHER PUBLICATIONS

Ishii et al., A calibration procedure for a hand eye system, IEEE, 1991, p. 655-660 vol. 1.*

*Primary Examiner*—Thomas Black
*Assistant Examiner*—McDieunel Marc
(74) *Attorney, Agent, or Firm*—Drinker Biddle & Reath LLP

(57) ABSTRACT

An offline teaching apparatus including a data acquiring section for acquiring position and orientation data and processing-condition data including interpolation commands, at respective predefined taught points, from an existing first processing program for a first workpiece; a processing-path calculating section for determining a processing path in the first program, based on the position and orientation data and the interpolation commands; a model generating section for generating, by using data of a second workpiece model of a second workpiece having geometrical features different from the first workpiece, a processing line showing a range of processing on the second workpiece; a taught-point calculating section for determining a geometrical correlation between the processing path and the processing line, and determining positions and orientations at respective taught points in the processing line; and a program generating section for generating a processing program for the second workpiece, by using the processing-condition data at the predefined taught points as well as the positions and the orientations at the taught points.

8 Claims, 6 Drawing Sheets

U.S. PATENT DOCUMENTS

| | | | |
|---|---|---|---|
| 6,324,443 B1 * | 11/2001 | Kurakake et al. | 700/245 |
| 6,327,518 B1 * | 12/2001 | Kaneko et al. | 700/245 |
| 6,330,493 B1 * | 12/2001 | Takahashi et al. | 700/245 |
| 6,332,101 B1 * | 12/2001 | Kaneko et al. | 700/245 |
| 7,149,602 B2 * | 12/2006 | Watanabe et al. | 700/245 |

FOREIGN PATENT DOCUMENTS

| | | |
|---|---|---|
| JP | 11-024724 A | 1/1999 |
| JP | 2000-075910 A | 3/2000 |
| JP | 2004-362018 | 12/2004 |

* cited by examiner

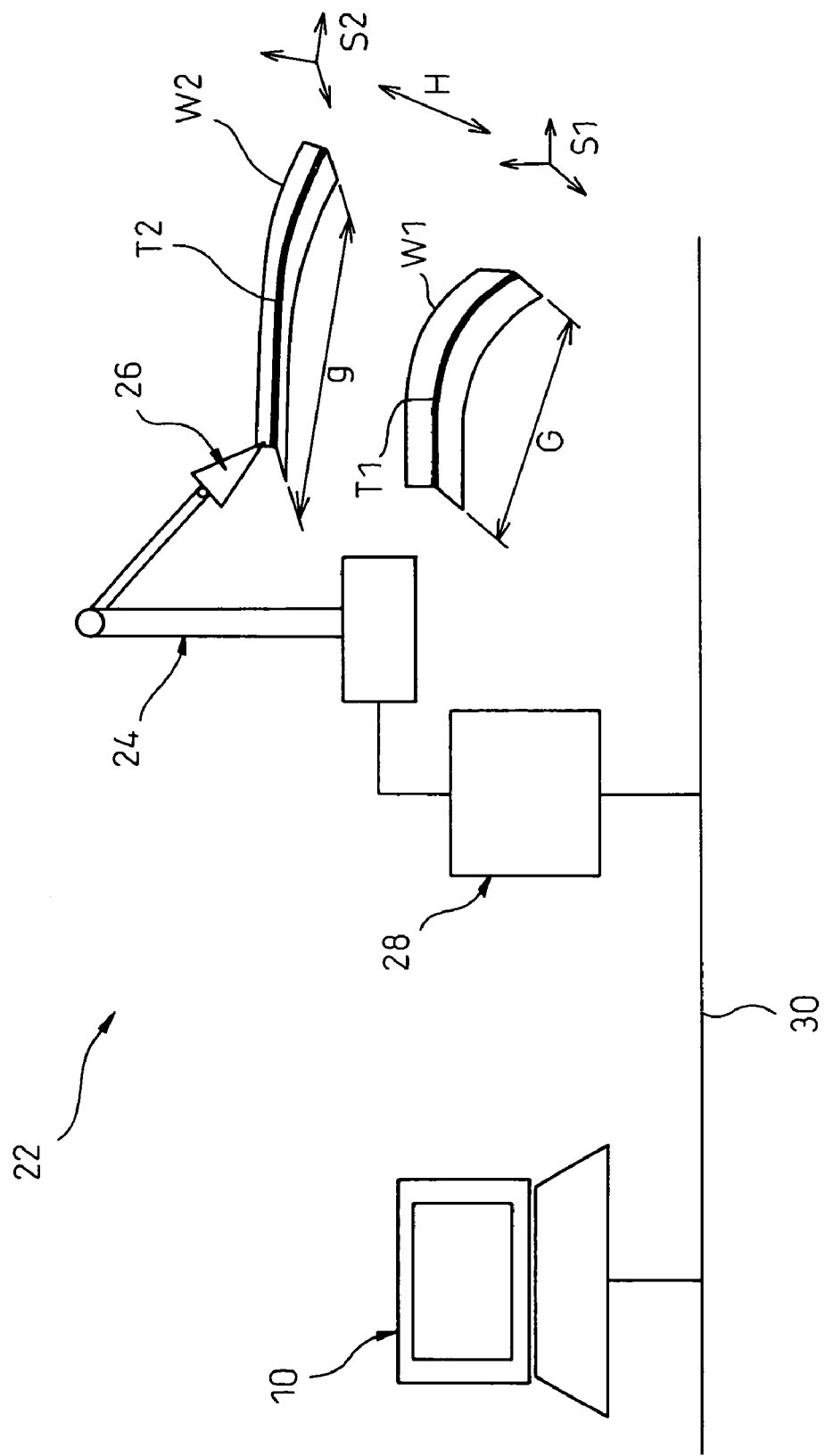

OFFLINE TEACHING APPARATUS FOR ROBOT

BACKGROUND OF THE INVENTION

1. Field of the Invention

The present invention relates generally to a programming technology for a robot and, more particularly, to an offline teaching apparatus for teaching, in an offline mode, a processing work of a robot.

2. Description of the Related Art

In a manufacturing system using a robot, especially an industrial robot, a processing robot system in which processing work, such as arc welding, is performed on a workpiece (i.e., an object to be worked) by a processing tool (i.e., an end-effector) attached to the end of a robot arm, has been conventionally known. In this type of robot processing system, in order to improve working efficiency in a manufacturing site, an offline teaching procedure, in which a processing work is taught without performing the operation of an actual robot, is employed. In the offline teaching procedure, the models of the robot and its working environment are provided in a computer, and the robot model is manipulated, on a display screen, to simulate a desired robot operation, so that position/orientation data, motion sequence data and process condition data, which are to be taught to the actual robot, are thus obtained.

Usually, when an offline teaching procedure is implemented in the processing robot system, an offline teaching apparatus, constructed by installing required software on a computer, prepares a processing program by using the models of a robot and its working environment, and thereafter passes the processing program to a robot controller controlling an actual robot, so as to cause the robot to perform, as a trial, the processing work on a workpiece under the control of the robot controller. Then, while checking the quality of the processing work, an optimal processing program is determined, by adjusting an arm orientation for a processing, a processing sequence for taught points, processing conditions, etc., and/or by adding commands to meet requirements. In this connection, processing conditions generally include conditions relating to the motion a robot arm, such as speed, acceleration, interpolation mode, etc., as well as conditions relating to the details of the processing work, such as welding current, laser power, etc.

In the manufacturing site employing the above-described processing robot system, there is a case where similar processing works are performed on workpieces having mutually similar geometrical features, such as shapes, dimensions, etc. In this case, if various data included in a processing program that has been prepared for a specified workpiece can be also used in another processing program to be prepared for another workpiece having similar geometry (i.e., a similar workpiece), it is expected that a programming procedure for a robot in relation to the similar workpiece can be facilitated, which may contribute to a further improvement of working efficiency in a manufacturing site.

For example, Japanese Unexamined Patent Publication (Kokai) No. 6-337711 (JP-A-6-337711) discloses an offline teaching apparatus, for a welding robot, in which teaching data (or a master program) for a workpiece having a basic shape (i.e., a basic workpiece) is used to prepare teaching data for a similar workpiece that can be constructed by the size-enlargement, the size-reduction and/or the parts-combination of the basic workpiece. The teaching data for the similar workpiece include position data prepared by modifying position data in the master program through the size-enlargement, the size-reduction and/or the parts-combination, as well as orientation data and welding condition data, which are the same as orientation data and welding condition data in the master program.

Also, Japanese Unexamined Patent Publication (Kokai) No. 2004-362018 (JP-A-2004-362018) discloses an offline teaching procedure, in which orientation data at respective taught points in existing teaching data relating to a specified workpiece is converted to orientation data at corresponding taught points relating to a similar workpiece, and thereby preparing teaching data for the similar workpiece. In this procedure, positions of the respective taught points for the similar workpiece have been set in advance.

In the conventional offline teaching apparatus as disclosed in JP-A-6-337711, it is possible to accomplish programming, based on the master program, only for a similar workpiece that can be constructed by the size-enlargement, the size-reduction and/or the parts-combination of the basic workpiece. In other words, it is not possible to accomplish programming, based on the master program, for a workpiece having such a shape as to require modifying the orientation of a robot in a welding work for the basic workpiece.

On the other hand, in the offline teaching procedure disclosed in JP-A-2004-362018, only the orientation data are used, from among the existing teaching data, for a programming procedure for a similar workpiece, and it is thus presupposed that the positions of the respective taught points for the similar workpiece are also be set in advance. The previous setting of the positions of the taught points requires profound knowledge and skill regarding the processing work.

SUMMARY OF THE INVENTION

It is an object of the present invention to provide an offline teaching apparatus for teaching, in an offline mode, a processing work of a robot, which can use, as effectively as possible, existing teaching data prepared for a specified workpiece, to prepare a processing program for a workpiece having geometrical features similar to those of the specified workpiece; which can easily prepare the processing program without repeating several works, such as a program trial by an actual robot, the adjustment of teaching data, the addition of commands, etc., even for a workpiece having such a shape as to require modifying the orientation of a robot in a processing work for the specified workpiece; and which thus can significantly improve working efficiency in a manufacturing site.

To accomplish the above object, the present invention provides an offline teaching apparatus for teaching, in an offline mode, a processing work of a robot, comprising a data acquiring section for acquiring position data, orientation data and processing-condition data including interpolation commands, at respective several predefined taught points related to an execution of processing, from an existing first processing program prepared for a first workpiece; a processing-path calculating section for determining a processing path in the first processing program, based on the position data, the orientation data and the interpolation commands at the several predefined taught points, acquired by the data acquiring section; a model generating section for generating, by using data of a second workpiece model provided by modeling a second workpiece having geometrical features different from geometrical features of the first workpiece, a processing line showing a range of processing on the second workpiece, in a manner as to be added to the second workpiece model; a taught-point calculating section for determining a geometrical correlation between the processing path determined by the processing-path calculating section and the processing line generated by the model generating section, and determining positions and orientations at respective several taught points in the processing line, based on the position data and the orientation data at the several predefined taught points acquired by the data acquiring section and the geometrical correlation; and a program generating section for generating a second processing program for the second workpiece, by using the processing-condition data at the several predefined taught points acquired by the data acquiring section as well as the positions and the orientations at the several taught points determined by the taught-point calculating section.

In the above offline teaching apparatus, the geometrical correlation determined by the taught-point calculating section may include a longitudinal dimension ratio between the processing path and the processing line. In this arrangement, the taught-point calculating section may determine the positions at the several taught points based on the position data at the several predefined taught points and the longitudinal dimension ratio.

The geometrical correlation determined by the taught-point calculating section may include a coordinate-transformation relationship between a predefined reference-coordinate system defining the several predefined taught points in the first processing program for the first workpiece and a reference-coordinate system defining the several taught points in the second processing program for the second workpiece. In this arrangement, the taught-point calculating section may determine the orientations at the several taught points based on the orientation data at the several predefined taught points and the coordinate-transformation relationship.

The above-described offline teaching apparatus may further comprise a provisional taught-point setting section for setting several provisional taught points, at which ideal positions and ideal orientations are respectively defined, in the processing line on the second workpiece model. In this arrangement, the program generating section may generate the second processing program by changing a position at a taught point determined by the taught-point calculating section to an ideal position at a provisional taught point set by the provisional taught-point setting section, in connection with a desired number of a taught-point pair, each pair including the taught point and the provisional taught point having a nearest positional correlation, from among the several taught points and the several provisional taught points in the processing line.

The data acquiring section may acquire, from the first processing program, position data and orientation data at one or more predefined taught point prior to a start of the processing. In this arrangement, the taught-point calculating section may determine a second geometrical correlation between the one or more predefined taught point prior to the start of the processing and a predefined taught point at the start of the processing in the processing path, and determine a position and an orientation at one or more taught points prior to a start of the processing for the second workpiece, based on a position and an orientation at a taught point, determined by the taught-point calculating section, at the start of the processing in the processing line and the second geometrical correlation. Further, the program generating section may generate the second processing program for the second workpiece, using the position and the orientation at the one or more taught points prior to the start of the processing.

Also, the data acquiring section may acquire, from the first processing program, position data and orientation data at one or more predefined taught point posterior to a termination of the processing. In this arrangement, the taught-point calculating section may determine a third geometrical correlation between the one or more predefined taught point posterior to the termination of the processing and a predefined taught point at the termination of the processing in the processing path, and determine a position and an orientation at one or more taught points posterior to a termination of the processing for the second workpiece, based on a position and an orientation at a taught point, determined by the taught-point calculating section, at the termination of the processing in the processing line and the third geometrical correlation. Further, the program generating section may generate the second processing program for the second workpiece, using the position and the orientation at the one or more taught points posterior to the termination of the processing.

BRIEF DESCRIPTION OF THE DRAWINGS

The above and other objects, features and advantages of the present invention will become more apparent from the following description of preferred embodiments in connection with the accompanying drawings, wherein:

FIG. 2 is an illustration schematically showing an example of a processing robot system including the offline teaching apparatus according to the present invention;

DETAILED DESCRIPTION

Figure 1:
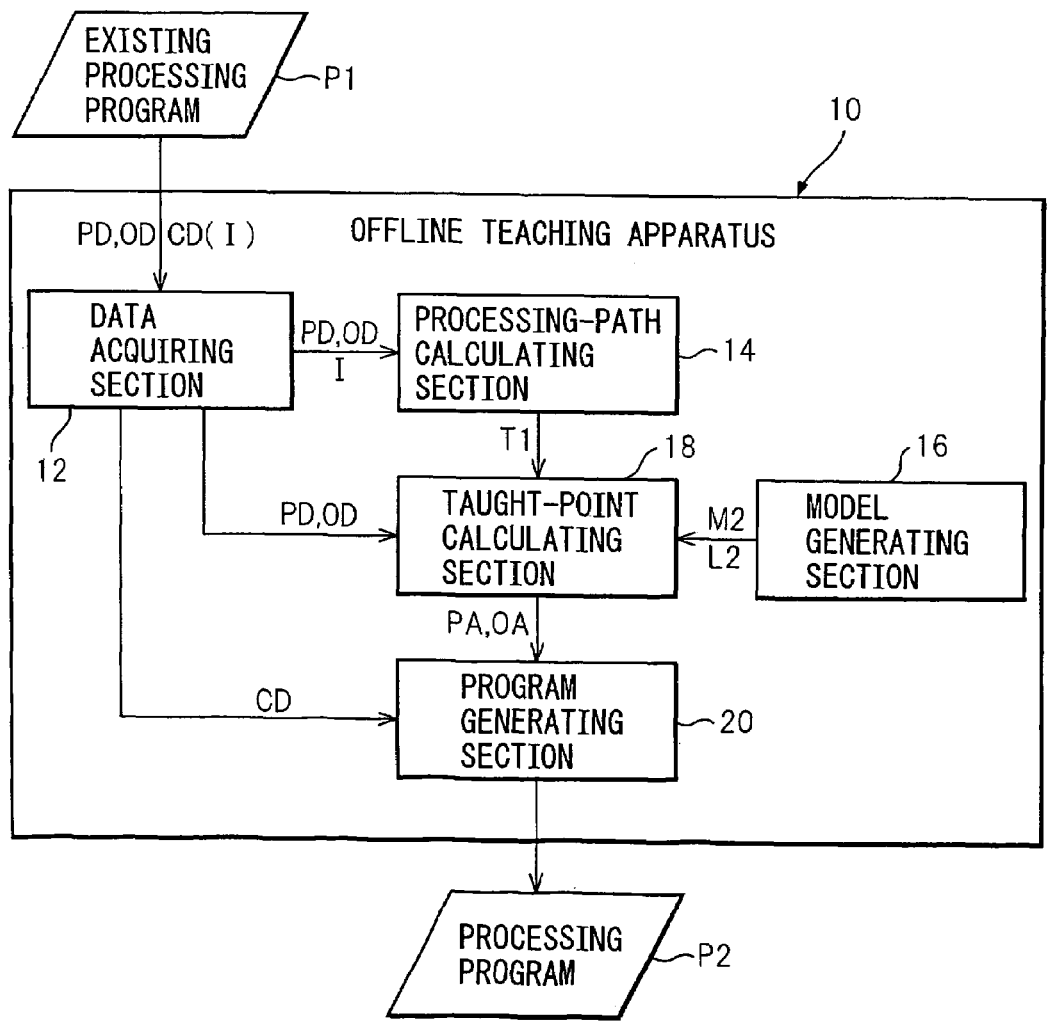
FIG. 1 is a functional block diagram showing the basic configuration of an offline teaching apparatus according to the present invention.

The embodiments of the present invention are described below, in detail, with reference to the accompanying drawings. In the drawings, the same or similar components are denoted by common reference numerals.

Referring to the drawings, FIG. 1 shows, by a block diagram, the basic configuration of an offline teaching apparatus 10 according to the present invention. The offline teaching apparatus 10 has a configuration for teaching, in an offline mode, a processing work of a robot, and may be constructed, for example, by installing required software on a computer such as a personal computer.

The offline teaching apparatus 10 includes a data acquiring section 12 for acquiring position data PD, orientation data OD and processing-condition data CD including interpolation commands I, at respective several predefined taught points related to the execution of processing, from an existing first processing program P1 prepared for a first workpiece; a processing-path calculating section 14 for determining a processing path T1 in the existing processing program P1, based on the position data PD, the orientation data OD and the interpolation commands I at the several predefined taught points, acquired by the data acquiring section 12; a model generating section 16 for generating, by using data of a second workpiece model M2 provided by modeling a second workpiece having geometrical features different from geometrical features of the first workpiece, a processing line L2 showing a range of processing on the second workpiece, in a manner as to be added to the second workpiece model M2; a taught-point calculating section 18 for determining a geometrical correlation between the processing path T1 determined by the processing-path calculating section 14 and the processing line L2 generated by the model generating section 16, and determines positions PA and orientations OA at respective several taught points in the processing line L2, based on the position data PD and the orientation data OD at the several predefined taught points acquired by the data acquiring section 12 and the geometrical correlation as determined; and a program generating section 20 for generating a second processing program P2 for the second workpiece, by using the processing-condition data CD at the several predefined taught points acquired by the data acquiring section 12 as well as the positions PA and the orientations OA at the several taught points determined by the taught-point calculating section 18.

In the offline teaching apparatus 10 having above-described configuration, the taught-point calculating section 18 can convert the position data PD and the orientation data OD at the plurality of predefined taught points in the processing path T1 into the positions PA and the orientations OA at the plurality of taught points in the processing line L2, respectively, in accordance with the geometrical correlation (e.g., a longitudinal dimension ratio) between the processing path T1 obtained from the existing processing program P1 and the processing line L2 of the second workpiece model M2. Further, the program generating section 20 can apply the processing-condition data CD at the plurality of predefined taught points in the processing path T1, in an unchanged state, to the plurality of taught points in the processing line L2, so as to add the data CD to the data of the positions PA and the orientations OA, and thereby can generate the processing program P2 for the second workpiece.

Therefore, in order to prepare the processing program P2 for the second workpiece having geometrical features similar to those of the specified first workpiece, it is possible to use, as effectively as possible, teaching data in the existing processing program P1 prepared for the first workpiece, and thus to easily prepare the processing program P2 without repeating several works, such as a program trial by an actual robot, the adjustment of teaching data, the addition of commands, etc., even for the second workpiece having such a shape as to require modifying the orientation of a robot in a processing work for the first workpiece. As a result, according to the offline teaching apparatus 10, it is possible to reduce a time required for starting up a processing robot system at a manufacturing site, and thus to significantly improve working efficiency of the system.

FIG. 2 schematically shows, by way of example, a processing robot system 22 into which the offline teaching apparatus 10 is incorporated. The processing robot system 22 includes a robot (or a mechanical section) 24 having, e.g., an articulated configuration, a processing tool 26 as an end-effector attached to the distal end of the arm of the robot 24, a robot controller 28 for controlling the operations of the robot 24 and of the processing tool 26, and the offline teaching apparatus 10 connected through a LAN 30 to the robot controller 28. The robot 24 operates in accordance with the existing processing program P1 (FIG. 1), under the control of the robot controller 28, so as to perform a processing by using the processing tool 26 on the first workpiece W1 along the designated processing path T1. Further, the robot 24 operates in accordance with the processing program P2 (FIG. 1) prepared by the offline teaching apparatus 10, under the control of the robot controller 28, so as to perform a processing by using the processing tool 26 on the second workpiece W2 along a designated processing path T2 corresponding to the processing line L2 (FIG. 1).

In this connection, by way of example, the first workpiece W1 and the second workpiece W2 are respectively provided with curved surfaces having curvatures different from each other, and the processing path T1 for the first workpiece W1 and the processing path T2 for the second workpiece W2 are configured as curved paths having mutually different curvatures and lengths. In accordance with the present invention, the robot 24 performs, for the first workpiece W1 and the second workpiece W2 having above-described slight differences (or similarities) therebetween, optimal processing works using the processing tool 26, in accordance with the existing processing program P1 (FIG. 1) stored in the robot controller 28 and with the processing program P2 (FIG. 1) prepared by the offline teaching apparatus 10 by effectively using the position data PD, the orientation data OD and the processing-condition data CD (FIG. 1) included in the existing processing program P1, respectively. Thus, the feature "the first workpiece W1 and the second workpiece W2 have mutually different geometrical features", in the invention of the present application, presupposes a configuration such that the shapes of two workpieces have a mutual similarity so as to belong to a generally identical category, in terms of geometrical categories such as a plate, a bar, a tube, a sphere, a frame, but include mutual differences in, e.g., one to three-dimensional sizes, curvatures of the curved surfaces, or profiles of local areas, which may result in necessity to modify the data of position and orientation in a processing program so as to permit the mutually corresponding portions of two workpieces to be processed by the processing program.

The processing-condition data CD in the existing processing program P1 include moving condition data, such as speed, acceleration, interpolation mode, etc., with regard to the motion of the arm of the robot 24, and working condition data, such as welding current, laser power, etc., with regard to the details of the processing work using the processing tool 26. In the offline teaching apparatus 10, it is not always necessary to use all of the data included in the processing-condition data CD in order to prepare the processing program P2. For example, in a case where the material of the first workpiece W1 is different from the material of the second workpiece W2, it may be required to change the working condition data, but even in this case, it is possible to easily prepare the processing program P2 by suitably utilizing data subjected to no change. As for the data of the second workpiece model M2, used by the model generating section 16 for generating the processing line L2, the offline teaching apparatus 10 may be configured such that the apparatus 10 is additionally provided with a designing function such as a CAD (computer aided design) so as to prepare the data by itself, or alternatively, that the apparatus 10 takes in, for use, the data prepared by an external device having a designing function such as a CAD.

In the above-described offline teaching apparatus 10, the geometrical correlation determined by the taught-point calculating section 18 may include a longitudinal dimension ratio G/g between the length G of the processing path T1 (FIG. 2) and the length g of the processing line L2 (FIG. 2). In this arrangement, the taught-point calculating section 18 determines the positions PA at the respective taught points, based on the position data PD at the respective predefined taught points and the longitudinal dimension ratio G/g. According to this configuration, it is possible to easily and accurately convert the position data PD at the plurality of predefined taught points in the processing path T1 into the positions PA at the plurality of taught points in the processing line L2.

Further, the geometrical correlation determined by the taught-point calculating section 18 may include a coordinate-transformation relationship H (FIG. 2) between a predefined reference-coordinate system S1 (FIG. 2) defining the plurality of predefined taught points (i.e., the processing path T1) in the existing processing program P1 for the first workpiece W1 and a reference-coordinate system S2 (FIG. 2) defining the plurality of taught points (i.e., the processing line L2) in the processing program P2 for the second workpiece W2. In this arrangement, the taught-point calculating section 18 determines the orientations OA at the respective taught points, based on the orientation data OD at the respective predefined taught points and the coordinate-transformation relationship H. According to this configuration, it is possible to easily and accurately convert the orientation data OD at the plurality of predefined taught points in the processing path T1 into the orientations OA at the plurality of taught points in the processing line L2.

An example of a procedure for preparing a processing program, in the offline teaching apparatus 10 having the above-described configuration, will be described below with reference to FIGS. 3A to 3E.

Figure 3A:
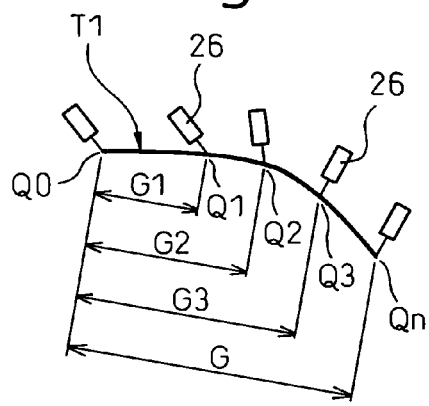
FIGS. 3A to 3E are illustrations respectively showing major steps in a procedure of preparing a processing program by using the offline teaching apparatus of FIG. 1.
Figure 3B:
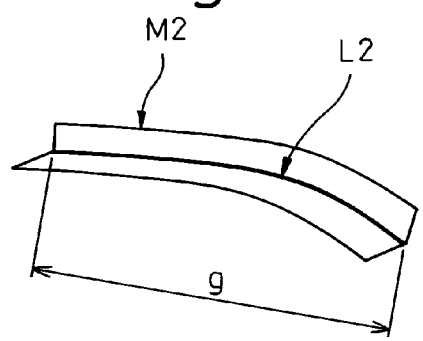

First, as shown in FIG. 3A, the processing path T1 is calculated by using the existing processing program P1 (FIG. 1) as described above, and a total path length G between a process start point (a predefined taught point) Q0 and a process termination point (a predefined taught point) Qn (n is a natural number) as well as path distances G1, G2, G3, . . . between the process start point Q0 and respective predefined taught points Q1, Q2, Q3, . . . are determined on the basis of the position data PD (FIG. 1). In this step, the orientation data OD and the processing-condition data CD (FIG. 1) regarding the processing tool 26 at the respective predefined taught points Q0 to Qn are also acquired.

Figure 3C:
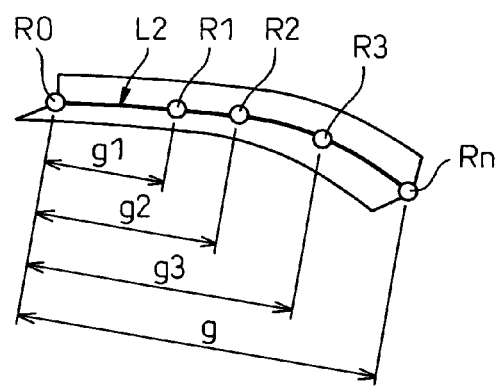

Next, a total length g of the processing line L2 on the second workpiece model M2 is determined (FIG. 3B), and the dimension ratio G/g between the total path length G of the processing path T1 and the total length g of the processing line L2 is determined. Then, a process start point (a taught point) R0 and a process termination point (a taught point) Rn are set at opposite ends of the processing line L2, respectively. Further, distances g1, g2, g3, . . . are determined by multiplying the path distances G1, G2, G3, . . . of the respective predefined taught points Q1, Q2, Q3, . . . in the processing path T1 by the dimension ratio G/g, and taught points R1, R2, R3, . . . are set at respective positions spaced by the distances g1, g2, g3, . . . from the process start point R0 in the processing line L2 (FIG. 3C). Consequently, positions PA (FIG. 1) at the respective taught points R0 to Rn with respect to the second workpiece model M2 are determined.

Figure 3D:
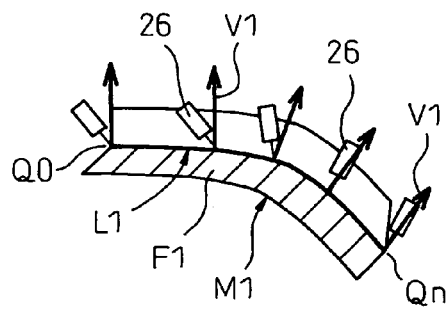
Figure 3E:
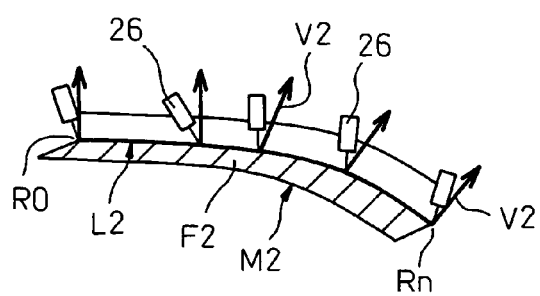

Thereafter, respective orientation matrixes at the respective predefined taught points Q0 to Qn, in the predefined reference-coordinate system S1 (FIG. 2) used in the existing processing program P1, are determined. In this connection, if the existing processing program P1 has been prepared through an offline teaching procedure, a first workpiece model M1 and a processing line L1, provided by modeling respectively the first workpiece W1 and the processing path T1, have existed. Therefore, it is possible, in the first workpiece model M1, to determine the predefined reference-coordinate system S1 and also to determine the orientation matrixes at the respective predefined taught points Q0 to Qn, on the basis of a reference plane F1, normal vectors V1 at the respective predefined taught points Q0 to Qn and the processing line L1 (FIG. 3D). In contrast, if the existing processing program P1 has been prepared by using the robot 24, a first workpiece model M1 and a processing line L1 do not exist. In this case, it is possible to determine the predefined reference-coordinate system S1 and the orientation matrixes at the respective predefined taught points Q0 to Qn, on the basis of successive (e.g., three) predefined taught points, an actual reference plane and normal vectors at the respective successive predefined taught points, Next, in the second workpiece model M2, the reference-coordinate system (or matrix) S2 (FIG. 2) used in the processing program P2 is determined on the basis of a reference plane F2, normal vectors at the respective taught points R0 to Rn and the processing line L2 (FIG. 3E). Then, respective orientation matrixes at the respective taught points R0 to Rn are determined by multiplying the orientation matrixes at the respective predefined taught points Q0 to Qn determined from the existing processing program P1 by the reference-coordinate system (or matrix) S2 (i.e., by applying the coordinate-transformation relationship H). Consequently, orientations OA (FIG. 1) at the respective taught points R0 to Rn with respect to the second workpiece model M2 are determined.

In accordance with above-described procedure, the position data PD and the orientation data OD at the respective several predefined taught points Q0 to On in the existing processing program P1 are converted to the positions PA and the orientations OA at the respective several taught points R0 to Rn on the second workpiece model M2. Then, the processing-condition data CD at the respective predefined taught points Q0 to Qn in the existing processing program P1 are applied and set, in an unchanged state, to the respective taught points R0 to Rn and, thereby, the processing program P2 for the second workpiece W2 is prepared. The processing program P2 thus prepared is given through, e.g., the LAN 30 to the robot controller 28, and the robot 24 performs the processing work in accordance with the processing program P2.

The offline teaching apparatus 10 having the above-described configuration allows the processing program P2 for the second workpiece W2 to be prepared by using the existing processing program P1 for the first workpiece W1, without requiring operator's skill based on experience, knowledge or proficiency. In addition to this configuration, if it is desired to effectively employ the operator's skill based on experience, knowledge or proficiency, it is advantageous that the operator can previously set, in connection with the second workpiece model M2, a provisional taught point provided with ideal teaching data (of a position, an orientation, a processing condition) promising an optimum processing quality, while taking the geometrical features of the second workpiece model M2 and the processing line L2 into consideration.

FIGS. 4, 5A to 5D show an offline teaching apparatus 40 according to a second embodiment of the present invention, which can effectively employ the operator's skill. The offline teaching apparatus 40 generally has the basic configuration of the above-described offline teaching apparatus 10, except for an additional configuration for setting the above-described provisional taught point and effectively using the teaching data thereof. Therefore, corresponding components are denoted by common reference numerals or symbols, and the explanations thereof are not repeated.

The offline teaching apparatus 40 further includes a provisional taught-point setting section 42 for setting several provisional taught points U0 to Un, at which ideal positions PB and ideal orientations OB are respectively defined, in the processing line L2 on the second workpiece model M2. In this arrangement, the program generating section 20 generates the processing program P2, by changing a position PA at a taught point Rm ($0 \leq m \leq n$) determined by the taught-point calculating section 18 to an ideal position PB at a provisional taught point Um ($0 \leq m \leq n$) set by the provisional taught-point setting section 42, in connection with a desired number of a taught-point pair RU, each pair including the taught point Rm and the provisional taught point Um having a nearest positional correlation, from among the several taught points R0 to Rn in the processing line L2, determined in the above-described procedure, and the several provisional taught points U0 to Un set by the provisional taught-point setting section 42. According to this configuration, the provisional taught points U0 to Un provided with ideal teaching data (of positions, orientations, processing conditions) promising an optimum processing quality are previously set, in connection with the second workpiece model M2, while taking the geometrical features of the second workpiece model M2 and the processing line L2 into consideration, and, as for the positions PA, the position PA at the taught point Rm determined by the taught-point calculating section 18 to the ideal position PB at the provisional taught point Um, so as to generate the processing program P2 and, therefore, it is possible to effectively employ the operator's skill.

In the above configuration, the geometrical correlation determined by the taught-point calculating section 18 may include a coordinate-transformation relationship H (FIG. 2) between a predefined reference-coordinate system S1 (FIG. 2) defining the plurality of predefined taught points Q0 to Qn (FIG. 3) in the existing processing program P1 for the first workpiece W1 (FIG. 2) and a reference-coordinate system S3 (=S2 (FIG. 2)) defining the provisional taught point Um of the taught-point pair RU in the processing program P2 for the second workpiece W2. In this arrangement, the taught-point calculating section 18 changes the ideal orientation OB at the provisional taught point Um of the taught-point pair RU to the orientation OA at the taught point Rm determined by the taught-point calculating section 18, based on the orientation data OD at the respective predefined taught points Q0 to Qn and the coordinate-transformation relationship H. According to this configuration, as for the orientations OA, the taught-point calculating section 18 changes the ideal orientation OB at the provisional taught point Um of the taught-point pair RU, based on the orientation data OD at the several predefined taught points Q0 to Qn and the coordinate-transformation relationship H and, therefore, it is possible to effectively employ the orientation data OD that has been optimized by trial.

Further, if the plural taught points R0 to Rn and the plural provisional taught points U0 to Un in the processing line L2 on the second workpiece model M2 include at least one of a taught point Rm and a provisional taught point Um, which do not constitute the taught-point pair RU, the program generating section 20 may operate to insert the at least one of the taught point Rm and the provisional taught point Um, not constituting the taught-point pair RU, into the processing program P2. According to this configuration, it is possible to use the data of the taught points or the provisional taught point, which cannot constitute the taught-point pair RU having a nearest positional correlation, among the plural taught points R0 to Rn calculated by the taught-point calculating section 18 and the plural provisional taught points U0 to Un set by the operator.

An example of a procedure for preparing a processing program, in the offline teaching apparatus 40 having above-described configuration, will be described in detail below to follow the illustrations of FIGS. 5A to 5D.

Figure 5A:
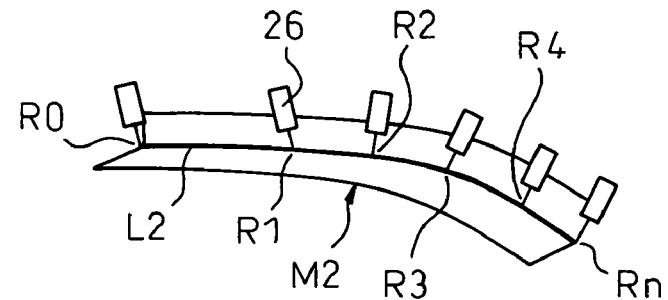
FIGS. 5A to 5D are illustrations respectively showing major steps in a procedure of preparing a processing program by using the offline teaching apparatus of FIG. 4.
Figure 5B:
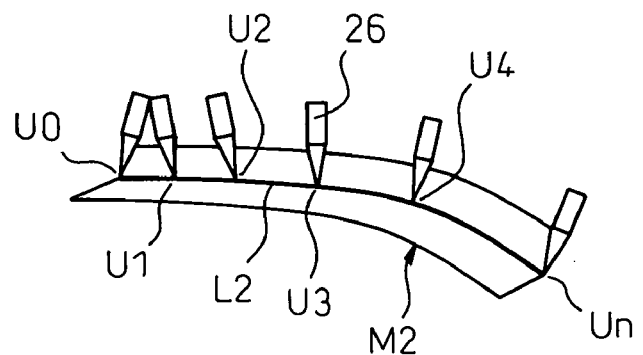

First, as shown in FIG. 5A, it is presupposed that the positions PA, the orientations OA and the processing conditions (corresponding to the predefined processing-condition data CD) at the plural taught points R0 to Rn in the second workpiece model M2 have been respectively determined in accordance with the above-described procedure (FIGS. 3A to 3E). On the other hand, as shown in FIG. 5B, an operator has previously set, in the second workpiece model M2, the plural provisional taught points U0 to Un provided respectively with the ideal teaching data (the positions, the orientations, the processing conditions) promising an optimal processing quality, while considering the geometrical features (curvature, dimension, etc.) of the second workpiece model M2 and the processing line L2.

Figure 5C:
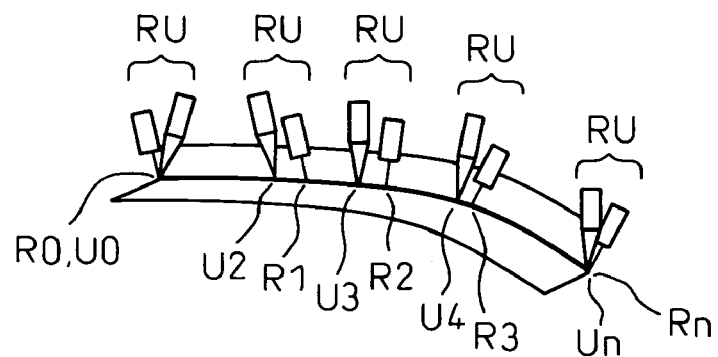
Figure 5D:
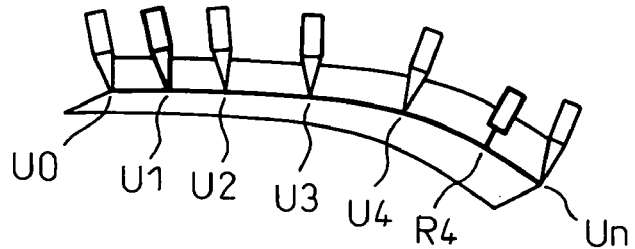

Next, in relation to the taught-point pairs RU (five pairs of R0-U0, R1-U2, R2-U3, R3-U4, Rn-Un in the drawing) having the nearest positional correlation along the processing line L2, the positions PA at the respective taught points R determined by the taught-point calculating section 18 are changed to the ideal positions PB at the respective provisional taught points, while the ideal orientations OB at the respective provisional taught points U set by the operator are changed to the orientations OA at the respective taught points R determined by the taught-point calculating section 18 (FIG. 5C). Thereafter, the taught point R (R4 in the drawing) and the provisional taught point U (U1 in the drawing), not constituting the taught-point pair RU, are inserted into the processing program P2 (FIG. 5D). As a result, the processing program P2 is prepared.

The above-described procedure for preparing the processing program, in the offline teaching apparatus 10, 40, can be accomplished by an operator while referring to a display screen provided in the offline teaching apparatus 10, 40. FIGS. 6A to 6F respectively show, by way of example, screen images displayed on the display screen at the major steps of the above-described processing program preparing procedure. The major steps of the above-described processing program preparation procedure will be described below to follow the illustrations of FIGS. 6A to 6F, in association with an instruction input operation by an operator.

Figure 6A:
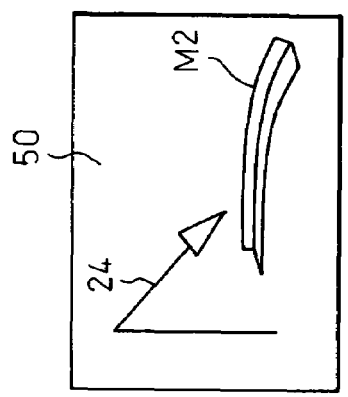
FIGS. 6A to 6F are illustrations respectively showing, as images provided on a display screen, the situations of the major steps in the procedure of preparing the processing program by using the offline teaching apparatus of FIG. 1 or 4.
Figure 6B:
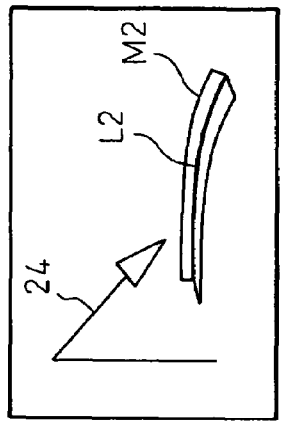
Figure 6C:
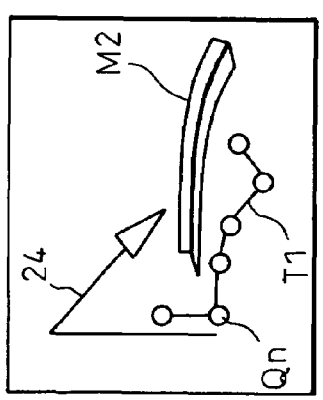

First, the model of the robot 24 and the second workpiece model M2 are displayed on a display screen 50 of the offline teaching apparatus 10 (40) (see FIG. 6A). Next, an input device such as a mouse (not shown) is manipulated to indicate an objective portion to be processed, on the image of the second workpiece model M2, and to display the processing line L2, thus generated, on the image (see FIG. 6B). Then, the existing processing program P1 (FIG. 1) is acquired from, e.g., the robot controller 28 (FIG. 2), and the processing path T1 and the predefined taught points Qn in the processing program P1 are displayed on the display screen of the offline teaching apparatus 10 (see FIG. 6C).

Figure 6D:
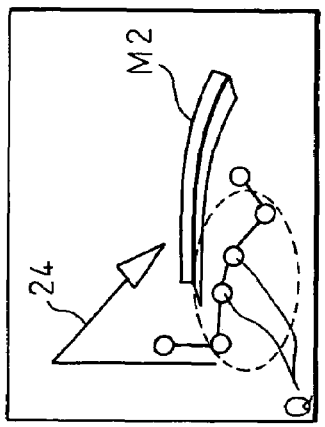
Figure 6E:
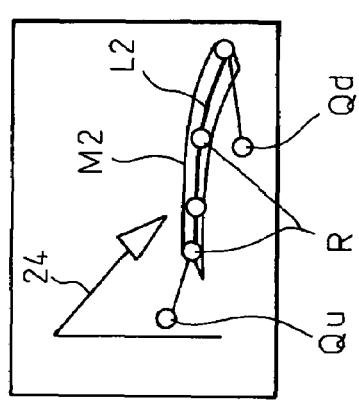
Figure 6F:
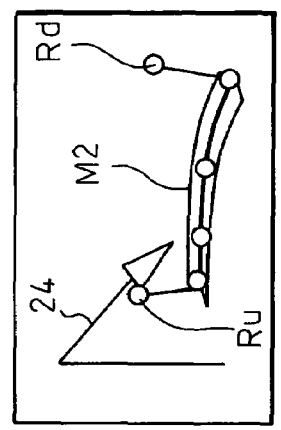

Next, from among the predefined taught points Qn in the existing processing program P1 (FIG. 1), the predefined taught point(s) Q requiring changing the data is indicated on the display screen by using an input device such as a mouse (see FIG. 6D). In accordance with this indication, the offline teaching apparatus 10 executes the above-described procedure and, as a result, a plurality of taught points R are displayed along the processing line L on the second workpiece model M2 (see FIG. 6E). Finally, from among the predefined taught points in the existing processing program P1 (FIG. 1), one predefined taught point Qu at the preceding stage of the processing path T1 (i.e., prior to the start of the processing) and one predefined taught point Qd at the following stage of the processing path T1 (i.e., posterior to the termination of the processing) are respectively changed to one taught point Ru at the preceding stage of the processing line L2 on the second workpiece model M2 (i.e., prior to the start of the processing) and one taught point Rd at the following stage of the processing line L2 (i.e., posterior to the termination of the processing), so as to correspond to the change of the predefined taught points Q to the taught points R (see FIG. 6F).

Figure 4:
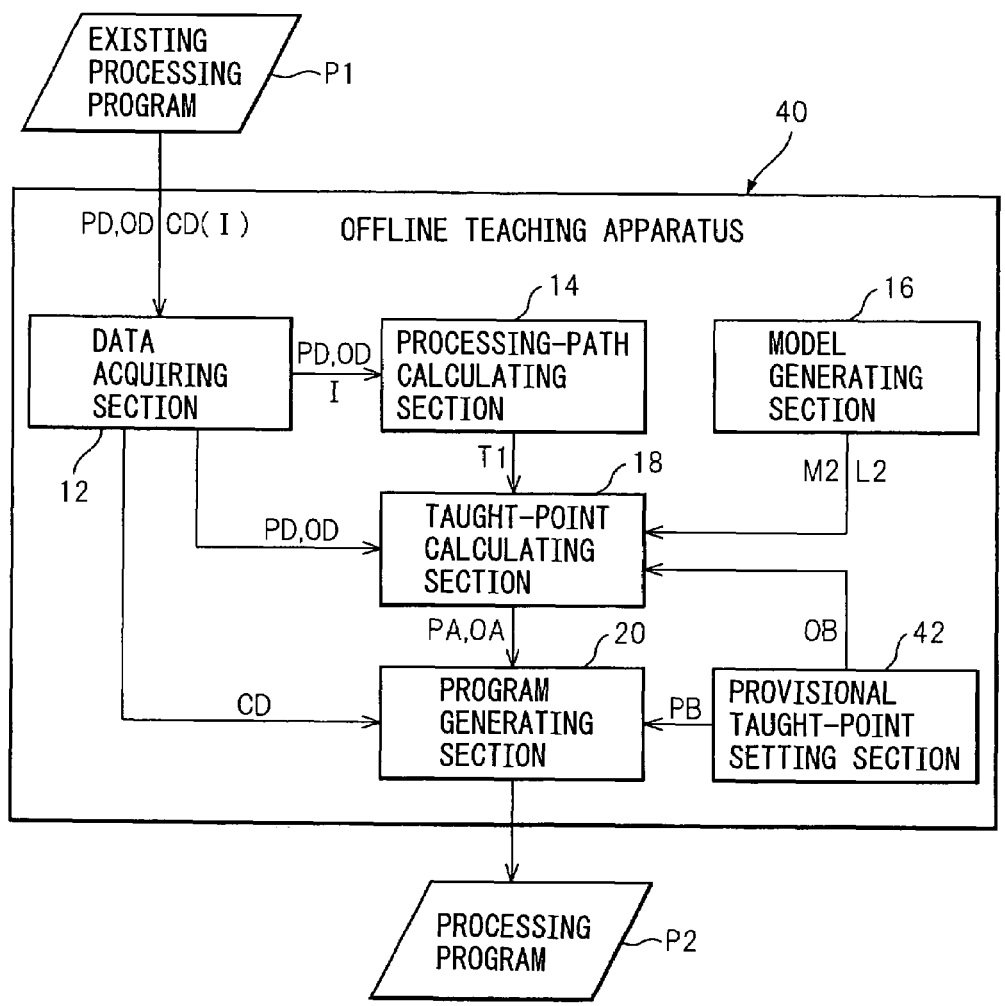
FIG. 4 is a functional block diagram showing the configuration of an offline teaching apparatus according to an embodiment of the present invention.

The configuration of the offline teaching apparatus 10, which permits the execution of the above-described procedure, will be described briefly below (see FIGS. 1 and 4, as for the components of the apparatus).

First, the data acquiring section 12 acquires, from the existing processing program P1, position data and orientation data at one or more predefined taught point Qu prior to the start of the processing. Next, the taught-point calculating section 18 determines a second geometrical correlation (e.g., a positional correlation) between the one or more predefined taught points Qu prior to the start of the processing and a predefined taught point Q0 (FIG. 3A) at the start of the processing in the processing path T1, and determines a position and an orientation at one or more taught points Ru prior to the start of the processing for the second workpiece W2, based on a position and an orientation at a taught point R0 (FIG. 3C), determined by the taught-point calculating section 18, at the start of the processing in the processing line L2 and the second geometrical correlation. Then, the program generating section 20 generates the processing program P2 for the second workpiece W2, using the position and the orientation at the one or more taught points Ru prior to the start of the processing. According to this configuration, it is possible to determine the position and the orientation at one or more taught points Ru set prior to the start of the processing for the second workpiece W2, by using the teaching data in the existing processing program P1.

Also, the data acquiring section 12 acquires, from the existing processing program P1, position data and orientation data at one or more predefined taught point Qd posterior to the termination of the processing. Next, the taught-point calculating section 18 determines a third geometrical correlation (e.g., a positional correlation) between the one or more predefined taught point Qd posterior to the termination of the processing and a predefined taught point Qn (FIG. 3A) at the termination of the processing in the processing path T1, and determines a position and an orientation at one or more taught points Rd posterior to the termination of the processing for the second workpiece W2, based on a position and an orientation at a taught point Rn (FIG. 3C), determined by the taught-point calculating section 18, at the termination of the processing in the processing line L2 and the third geometrical correlation. Then, the program generating section 20 generates the processing program P2 for the second workpiece W2, using the position and the orientation at the one or more taught points Rd posterior to the termination of the processing. According to this configuration, it is possible to determine the position and the orientation at one or more taught points Ru set posterior to the termination of the processing for the second workpiece W2, by using the teaching data in the existing processing program P1.

In the above-described configuration, in order to determine the taught point Ru prior to the start of the processing for the second workpiece W2 based on the taught point R0 at the start of the processing in the processing line L2 and the second geometrical correlation, a procedure may be employed in which, for example, a coordinate system representing the predefined taught point Qu prior to the start of the processing as seen from the predefined taught point Q0 at the start of the processing in the processing path T1 (i.e., the second geometrical correlation) is determined in the existing processing program P1, and the coordinate of the taught point R0 at the start of the processing in the processing line L2 is multiplied by the coordinate system as determined. Similarly, in order to determine the taught point Rd posterior to the termination of the processing for the second workpiece W2 based on the taught point Rn at the termination of the processing in the processing line L2 and the third geometrical correlation, a procedure may be employed in which, for example, a coordinate system representing the predefined taught point Qd posterior to the termination of the processing as seen from the predefined taught point Qn at the termination of the processing in the processing path T1 (i.e., the third geometrical correlation) is determined in the existing processing program P1, and the coordinate of the taught point Rn at the termination of the processing in the processing line L2 is multiplied by the coordinate system as determined.

As will be apparent from the foregoing description, in accordance with the present invention, when a processing program is prepared for a workpiece having geometrical features similar to those of a specified workpiece, it is possible to use, as effectively as possible, existing teaching data prepared for the specified workpiece, and thus to easily prepare the processing program without repeating several works, such as a program trial by an actual robot, the adjustment of teaching data, the addition of commands, etc., even for a workpiece having such a shape as to require modifying the orientation of a robot in a processing work for the specified workpiece. As a result, according to the present invention, it is possible to reduce a time required for starting up a processing robot system at a manufacturing site, and thus to significantly improve working efficiency of the system.

While the invention has been described with reference to specific preferred embodiments, it will be understood, by those skilled in the art, that various changes and modifications may be made thereto without departing from the scope of the following claims.

The invention claimed is:

1. An offline teaching apparatus for teaching, in an offline mode, a processing work of a robot, comprising:
   a data acquiring section for acquiring position data, orientation data and processing-condition data including interpolation commands, at respective several predefined taught points related to an execution of processing, from an existing first processing program prepared for a first workpiece;
   a processing-path calculating section for determining a processing path in said first processing program, based on said position data, said orientation data and said interpolation commands at said several predefined taught points, acquired by said data acquiring section;

a model generating section for generating, by using data of a second workpiece model provided by modeling a second workpiece having geometrical features different from geometrical features of said first workpiece, a processing line showing a range of processing on said second workpiece, in a manner as to be added to said second workpiece model;

a taught-point calculating section for determining a geometrical correlation between said processing path determined by said processing-path calculating section and said processing line generated by said model generating section, and determining positions and orientations at respective several taught points in said processing line, based on said position data and said orientation data at said several predefined taught points acquired by said data acquiring section and said geometrical correlation; and a program generating section for generating a second processing program for said second workpiece, by using said processing-condition data at said several predefined taught points acquired by said data acquiring section as well as said positions and said orientations at said several taught points determined by said taught-point calculating section.

2. An offline teaching apparatus as set forth in claim 1, wherein said geometrical correlation determined by said taught-point calculating section includes a longitudinal dimension ratio between said processing path and said processing line; and wherein said taught-point calculating section determines said positions at said several taught points based on said position data at said several predefined taught points and said longitudinal dimension ratio.

3. An offline teaching apparatus as set forth in claim 1, wherein said geometrical correlation determined by said taught-point calculating section includes a coordinate-transformation relationship between a predefined reference-coordinate system defining said several predefined taught points in said first processing program for said first workpiece and a reference-coordinate system defining several taught points in said second processing program for said second workpiece; and wherein said taught-point calculating section determines said orientations at said several taught points based on said orientation data at said several predefined taught points and said coordinate-transformation relationship.

4. An offline teaching apparatus as set forth in claim 1, further comprising a provisional taught-point setting section for setting several provisional taught points, at which ideal positions and ideal orientations are respectively defined, in said processing line on said second workpiece model; wherein said program generating section generates said second processing program by changing a position at a taught point determined by said taught-point calculating section to an ideal position at a provisional taught point set by said provisional taught-point setting section, in connection with a desired number of a taught-point pair, each pair including said taught point and said provisional taught point having a nearest positional correlation, from among said several taught points and said several provisional taught points in said processing line.

5. An offline teaching apparatus as set forth in claim 4, wherein said geometrical correlation determined by said taught-point calculating section includes a coordinate-transformation relationship between a predefined reference-coordinate system defining said several predefined taught points in said first processing program for said first workpiece and a reference-coordinate system defining said provisional taught point of said taught-point pair in said second processing program for said second workpiece; and wherein said taught-point calculating section changes said ideal orientation at said provisional taught point of said taught-point pair based on said orientation data at said several predefined taught points and said coordinate-transformation relationship.

6. An offline teaching apparatus as set forth in claim 4, wherein, if said several taught points and said several provisional taught points in said processing line include at least one of a taught point and a provisional taught point, not constituting said taught-point pair, said program generating section operates to insert said at least one of said taught point and said provisional taught point, not constituting said taught-point pair, into said second processing program.

7. An offline teaching apparatus as set forth in claim 1, wherein said data acquiring section acquires, from said first processing program, position data and orientation data at one or more predefined taught point prior to a start of said processing; wherein said taught-point calculating section determines a second geometrical correlation between said one or more predefined taught point prior to said start of said processing and a predefined taught point at said start of said processing in said processing path, and determines a position and an orientation at one or more taught points prior to a start of said processing for said second workpiece, based on a position and an orientation at a taught point, determined by said taught-point calculating section, at said start of said processing in said processing line and said second geometrical correlation; and wherein said program generating section generates said second processing program for said second workpiece, using said position and said orientation at said one or more taught points prior to said start of said processing.

8. An offline teaching apparatus as set forth in claim 1, wherein said data acquiring section acquires, from said first processing program, position data and orientation data at one or more predefined taught point posterior to a termination of said processing; wherein said taught-point calculating section determines a third geometrical correlation between said one or more predefined taught point posterior to said termination of said processing and a predefined taught point at said termination of said processing in said processing path, and determines a position and an orientation at one or more taught points posterior to a termination of said processing for said second workpiece, based on a position and an orientation at a taught point, determined by said taught-point calculating section, at said termination of said processing in said processing line and said third geometrical correlation; and wherein said program generating section generates said second processing program for said second workpiece, using said position and said orientation at said one or more taught points posterior to said termination of said processing.

* * * * *